June 13, 1950          H. H. GORDON          2,511,631
AUTOMOTIVE VEHICLE POWER PLANT INDICATING SYSTEM
Filed Jan. 22, 1947          3 Sheets-Sheet 1

INVENTOR.
HAYNER H. GORDON
BY Charles H Braselton
Attorney

June 13, 1950     H. H. GORDON     2,511,631
AUTOMOTIVE VEHICLE POWER PLANT INDICATING SYSTEM
Filed Jan. 22, 1947     3 Sheets-Sheet 2

INVENTOR.
HAYNER H. GORDON
BY Chester H. Braselton
Attorney

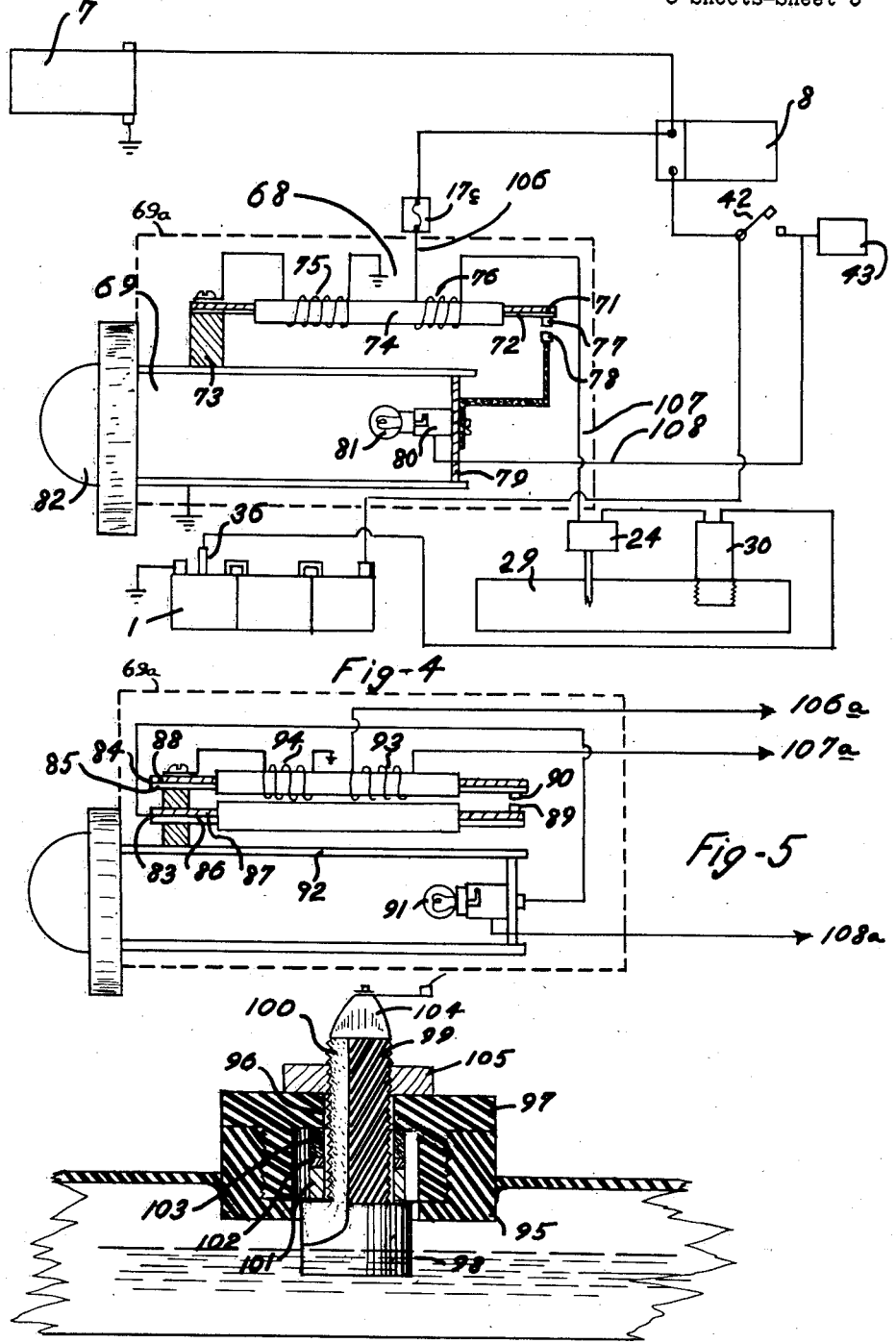

Patented June 13, 1950

2,511,631

UNITED STATES PATENT OFFICE 2,511,631

AUTOMOTIVE VEHICLE POWER PLANT INDICATING SYSTEM

Hayner H. Gordon, Washington, D. C., assignor to Hayner Corporation, New York, N. Y., a corporation of New York Application January 22, 1947, Serial No. 723,597

10 Claims. (Cl. 177—311)

1

The present invention relates to an indicating device for the operational characteristics of automotive vehicles and is a continuation, in part, of my pending application Serial No. 646,- 317, filed February 8, 1946, entitled "Indicating device for automobiles."

The modern automotive vehicle, especially characterized by the automobile, is comprised of numerous mechanical and electrical components which must work together harmoniously for safe economical operation of the vehicle. Its power plant, for instance, includes such correlated device as an electrical generator, means for regulating the output of this generator irrespective of speed variation, a storage battery, an automatic electrical cutout between the generator and storage battery, means for supplying lubricating oil under pressure to the various components of the engine, and a means for cooling the engine to maintain its operation at a safe temperature.

It is the present day practice to indicate the operational characteristics of a vehicle's components by means of various dials and meters with movable hands. The average driver usually ignores these indicators while driving because of the hazard involved in taking his eyes off the road. However, it is to the driver's advantage to be instantly aware of any improperly functioning component of the vehicle.

It is one of the purposes of the present invention to quite economically consolidate the indicators for the functions of two or more existing dash board meters in a single signal means, visual or audible in character, or if desired, both, and in a position to attract the attention of the driver at any time, whenever one or more of the indicatable functions is not properly operating.

It is a further object of the present invention to provide a single means, or single set of means, for indicating the normal or abnormal functionin of a plurality of portions of the automotive mechanism to indicate when any of the respective portions are not properly operating, and test mechanism whereby the particular improperly operating portion or portions may be determined.

It is also an object of the present invention to embody some or all of the functions to be realized from my pending application, Serial No. 646,317, filed February 8, 1946, entitled "Indicating device for automobiles," in a simpler, more economical and more convenient form.

Other objects of this invention will be apparent from the following description of a preferred embodiment of my invention, and other modifications, all as illustrated in the accompanying drawings, and in which:

Fig. 4 is a diagram indicating another embodiment of my invention utilizing a thermal type of relay.

Fig. 5 shows a preferred form of thermal relay used in utilizing dual bi-metallic armatures for ambient temperature compensation.

Fig. 6 shows a preferred form of an adjustable type intermediate electrode for a storage battery adapting same for convenient use in my invention.

Figure 1:
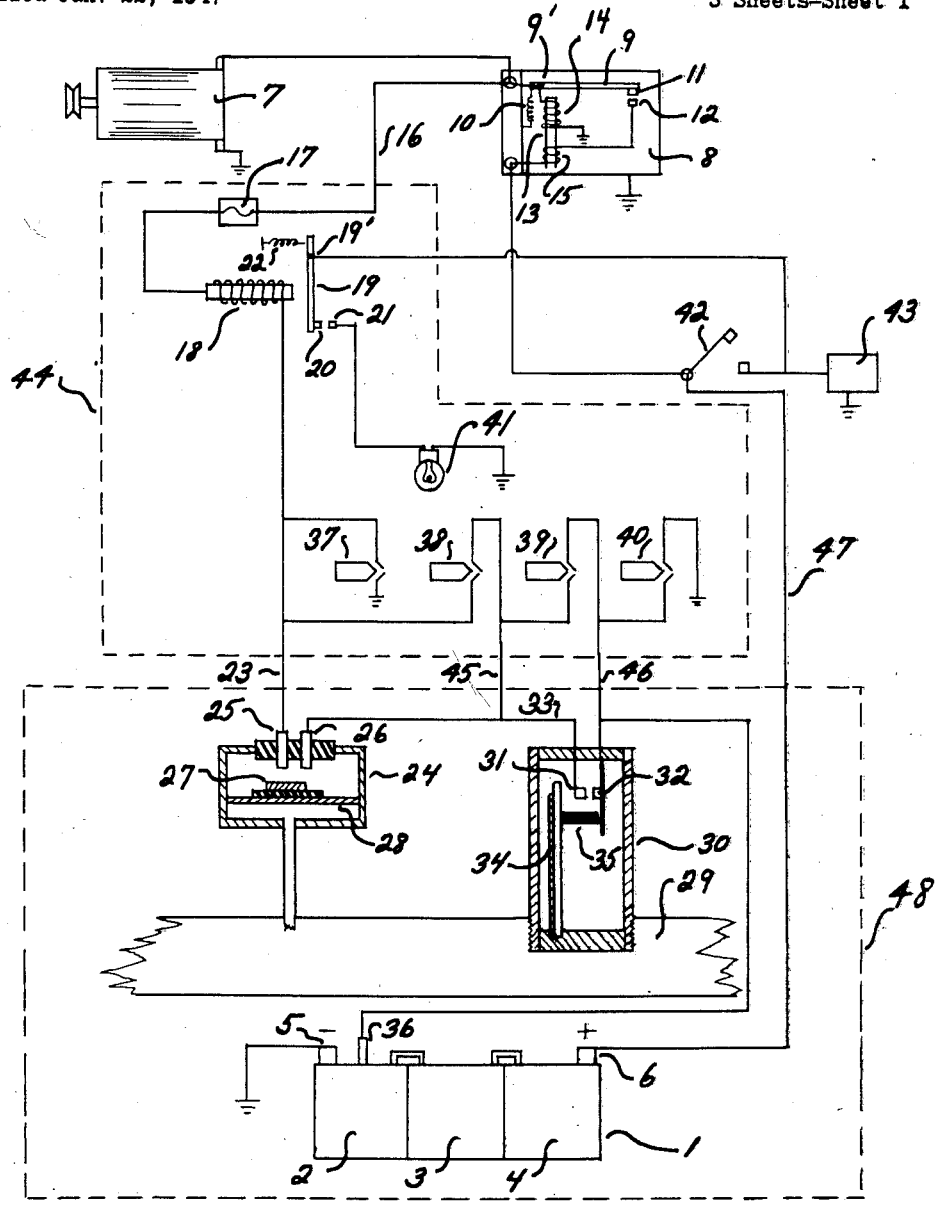
Fig. 1 is a diagrammatic representation of a generator-battery circuit showing the addition of my improved device for indicating the manner of functioning of several vehicle components.

In the embodiment of the invention illustrated in Fig. 1, a storage battery 1, consisting of three individual cells, 2, 3 and 4, has its negative terminal 5 grounded and its positive terminal 6 adapted for connection to a variable speed generator 7 through a conventional generator cut-out or relay shown at 8, via circuit path 47.

The cut-out relay 8, in its conventional form is comprised of an armature 9 pivoted at 9' and normally held open by means of a spring 10. The armature carries a contact 11 which cooperates with a second contact 12 to complete the circuit between the generator and battery through the pivoted armature. The means for actuating the armature consists of a magnet core 13 with a shunt winding 14 connected across the generator terminals (through ground) and a series winding 15 in the circuit between the generator and battery. In operation, the armature 9 is actuated against the spring tension when the generator speed is sufficient to generate a suitable voltage for charging purposes in excess of the storage battery terminal voltage (between terminals 5 and 6). This is accomplished by the flux created in the cut-out core 13 caused by the current flowing through the shunt winding 14, which is directly across the output of the variable speed generator 7 at all times. Actuation of the armature 9 brings contact 11 in touch with contact 12, completing the charging path through the series winding 15 to the storage battery 1. The series winding 15 is so proportioned to oppose the magnemotive force created by the shunt winding 14, whenever the speed and voltage of the generator is low enough to allow current to flow from the battery back through the generator, thus acting as a load on and effectively discharging the storage battery. When this happens the spring 10 actuates the armature of the cut-out at the instant the net flux in core 13 is insufficient to hold the armature down against the spring tension. This disconnects the battery from the generator by opening contacts 11 and 12. This isolating action usually occurs whenever the car is operated at low speeds or the engine is idling. Should, however, the cut-out fail to close when the motor speed is increased, the conventional variable speed generator would not have the storage battery as a load and consequently the generator voltage may easily become dangerously high with subsequent damage to itself or other circuits which may be directly connected thereto.

Further shown in Fig. 1 a circuit path 16 from the generator terminal of the cut-out relay 8 passes through a suitable fuse 17 to the winding of a magnetic relay 18 having an armature 19 pivoted at 19', with contacts 20 and 21. The circuit continues following path 23 to contact 25 on oil pressure switch 24. The oil pressure switch 24 consists of two contacts 25 and 26, insulated from ground, which are electrically connected by means of plate 27, also insulated from and mounted on pressure diaphragm 28 when the oil pressure in the crankcase of engine 29 is of a satisfactory magnitude. Should the oil or lubricant pressure fall below a safe operating magnitude, the diaphragm 28, which is actuated by the lubricant pressure, will open the electrical path between contacts 25 and 26.

Leaving oil pressure switch 24 by contact 26 the circuit continues via path 33 to contact 31 on engine temperature switch 30. Engine temperature switch 30 is mounted in a portion 29 of the engine wall and is shown threaded at the base to permit the screwing of the temperature switch into a suitable measurement hole in the cylinder head cooling jacket of a modern internal combustion engine. Contacts 31 and 32, insulated from ground, are normally closed. If the engine temperature during operation rises to an unsafe value, bi-metallic arm 34 with its insulating extension 35, moves to the right in Fig. 1 so as to cause contact 32 to separate from contact 31 and thereby render the temperature switch electrically open.

From contact 32 on temperature switch 30 the circuit following path passes to an intermediate electrode 36 which is inserted in the cell 2 at the grounded end of battery 1. This intermediate electrode 36 extends below the normal level of the electrolyte of this cell. The electrode may be made of any suitable material that will cause no deleterious electrolytic action to take place. I prefer to make the electrode out of the same lead-antimony alloy that is used in making the battery grids. By merit of the electrical conductivity of the acidic electrolyte, the circuit will find a closed path to ground from electrode 36 through the electrolyte as long as the electrolyte in the cell is of normal level. Should the electrolyte level fall below the lower end of this intermediate electrode, there would result an effective electrically open circuit from electrode 36 to ground.

Switches 37, 38, 39 and 40 are normally open "depress to make" push buttons serving as test buttons, and are preferably mounted in the vicinity of the vehicle's dash board within the working range of the driver. Lamp 41 is normally mounted behind a red jewel on the dash board within the visual range of the driver. Switch 42 represents the common ignition switch which when closed allows battery voltage to be applied to ignition system 43 and the armature 19 of relay 18.

Reiterating it is seen from Fig. 1 that the electrical circuit from the generator terminal of the cut-out relay, following path 16, includes the fuse 17, magnetic signalling relay 18, oil pressure switch 24, engine temperature switch 30 and intermediate battery electrode 36 which, under normal electrolyte level conditions, allows a return path through ground at 5 to the generator 7, and through the generator to the cut-out relay again.

The above traced circuit may be thought of as the Basic control circuit and under normal operating conditions, with the engine running, this Basic control circuit is electrically closed through the metering switches, 24 and 30, and the intermediate battery electrode 36. Should any monitored components fail to function properly it is seen that this control circuit electrically opens. Also under normal operating conditions there will flow through this circuit an electric current which will set up a magnemotive force in the core of the signalling relay 18.

Relay 18 is so designed that even with the minimum of current flowing in the control circuit and passing through its coil, the M. M. F. set up in the core is sufficient to cause its armature 19, pivoted at 19', to overcome the spring tension of spring 22 and thereby separate contacts 20 and 21, effectively breaking the lamp circuit and extinguishing the danger signal.

It is seen that the absence of sufficient current through the signalling relay 18 will allow armature 19 to be moved by spring 22 and close contacts 20 and 21, which permits battery current to pass through red lamp 41 and provide a visual danger signal, indicating that some component in the control circuit is malfunctioning. It is now desired to provide means for determining which component is faulty.

Since the basic control circuit is simply a series circuit consisting essentially of a number of "normally" closed switches, each associated with some automotive function, it only remains to provide a number of test buttons which will short out or by-pass individual series switches in the control circuit. Switches 37, 38, 39 and 40 provide such test buttons for a Generator-cutout test, Oil pressure test, Engine temperature test and Electrolyte level test, respectively.

Assume the engine is running at or above an idling speed sufficient to develop in the generator a voltage great enough to establish in the unbroken control circuit a current magnitude which will cause the relay 18 to break contacts 20 and 21, but that due to some abnormality no current flows through the control circuit and the red lamp 41 is established.

(a) If then, depressing button 37 (Generator-cutout test) does not extinguish the red lamp, it will be clear that either the generator is not generating sufficient voltage or that the cutout relay has failed to close, thereby removing the load on the generator caused by the battery and permitting the generator voltage to rise to a dangerously high value (in the order of 20–30 volts) and causing fuze 17 to open due to the excessive current through the control circuit created by this excessive generator voltage. However, had the lamp been extinguished by depressing button 37, the conclusion would have been that the generator cut-out circuit was properly functioning and that the trouble lies elsewhere.

(b) If then, depressing button 38 (Oil pressure test) extinguishes the red signal we could be sure that the fault was improperly low oil pressure, since button switch 38 merely by-passes oil pressure switch 24, via circuits 23 and 45. Failure to extinguish the signal when button 38 is depressed indicates the trouble is again elsewhere.

(c) Now depressing test button 39 (Engine temperature test) which by-passes the Engine temperature switch 30 via circuits 45 and 46, will extinguish the red signal if the engine temperature be abnormally high. If lamp is not extinguished, the engine temperature may be regarded as normal and a further test is made.

(d) Lastly button 40 (Battery electrolyte level test) will be depressed. If none of the other tests have revealed a faulty component we can expect the signal lamp to be extinguished, since this switch by-passes to ground the test circuit around the electrolytic path through electrode 36 and the battery electrolyte indicating that the battery electrolyte level is low.

The information gleaned from the above tests is in no way dependent upon the order in which the buttons are depressed, since each button is directly associated with a monitor switch representing some vehicle function.

Another feature of this circuit allows for a signal should the ignition be inadvertently left on without the motor running. This is clearly seen since the signal lamp circuit receives its battery voltage from the ignition system side of the ignition switch 42 and therefore before the engine causes the generator to generate enough voltage to sufficiently energize the signalling relay 18, the lamp circuit will be supplied with battery power. This arrangement also insures extinction of indicator lamp when car ignition is off.

It is pointed out that since the control circuit is simply a series circuit, any of the above monitoring switches described may be omitted (with associated test button), or other monitoring series switches may be conveniently added in any portion of the control circuit to provide information regarding the operation of other parts of the vehicle.

For ease in future reference to Fig. 1 pertaining to other embodiments, the circuit components described and enclosed in dotted area 44 comprise what will be termed the "Signaling-test section" of the system and whose components can be conveniently mounted on or near the instrument panel of the vehicle. Circuit components and associated connecting electrical circuits described and enclosed in dotted area 48 comprise the preferred arrangement of series monitoring switches necessary for Oil pressure, Engine temperature and Battery electrolyte level information. This preferred arrangement having been previously fully described and consisting only of a simple electrical series circuit with individual monitor switch by-pass circuits 23—45—46 to the "Signaling-test section" (area 44), will be used, as shown and described, in subsequent descriptions of embodiments of my invention having only to do with changes of the "Signalling-test section" arrangement alone. When so used these components and associated electrical circuits will be termed the "Monitor section" of the embodiment.

Figure 2:
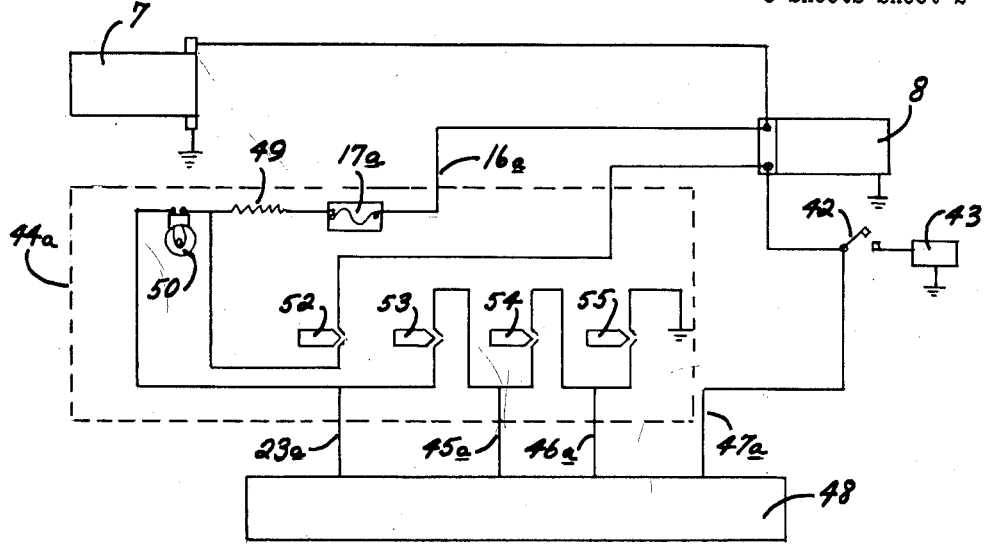
Fig. 2 is a similar view of a circuit similar to that shown in Fig. 1 but embodying a modified form of signalling and test circuit.

The arrangement shown in Fig. 2 is similar to Fig. 1 but embodies a change in the "Signalling-test section" only, which allows a more uniform Generator-cutout test signal to be realized.

It may be remembered that the arrangement shown in Fig. 1 provided a test button system which permitted the vehicle operator to determine which monitored component of his automotive vehicle was faulty should he perceive a red danger signal due to opening of the Basic control circuit or battery connection or failure of either the generator, or the cut-out relay. It is noticed that when the Generator cutout test button 37 was depressed, extinction of the danger signal lamp 41 indicated that both the generator and cutout were properly functioning. However, extinction of the danger signal in all other individual tests indicated improper functioning.

The arrangement in Fig. 2 provides a system for standardizing this Generator-cutout test should it be so desired.

As in Fig. 1 the basic control circuit of Fig. 2 receives its power from the generator side of the cut-out relay and following path 16a passes through fuze 17a. Here the control circuit deviates from Fig. 1, now passing through resistance 49 to lamp 50 and on to the series monitoring section 48 via path 23a.

The inverting action realized from the signalling relay 18 in Fig. 1 has been eliminated, hence normal operation of the vehicle is now indicated by the lighting of lamp 50 by a sufficient value of control circuit current. Lamp 50 is appropriately mounted behind a green jewel on the instrument panel of the vehicle and provides a green-go ahead signal to the operator, informing him that monitored components of his vehicle are properly functioning. Should the series control circuit be opened by some component of the "Monitor section" or should the generator or cut-off fail, current through lamp 50 would sufficiently decrease or cease, and dimming or extinction of the lamp would inform the operator that something was wrong. Attention may again be drawn to the effect caused by failure of the cut-out relay to close, opening of battery connections or failure of generator to regulate properly and supply abnormally high voltage. In these events, current through the test circuit would exceed the capacity of fuse 17a and blow the fuse, thereby opening the basic control circuit through the lamp 50 and extinguishing same.

In the event of trouble, the exact cause may be determined by test buttons 52, 53, 54 and 55, serving as Generator-cutout test, Oil pressure test, Engine temperature test and Electrolyte level test respectively. The method of by-passing various elements of the "Monitor section" via circuits 23a, 45a and 46a are the same as described in Fig. 1. However, the Generator-cutout test circuit is altered as shown to provide uniformity of test signal so that all the operator need do is press various test buttons until the green signal is reestablished. The button that reestablishes the green signal is the one corresponding to the faulty component. Pressing the Generator-cutout button 52 establishes an electrical path from the battery side of the cutout relay to lamp 50. Thus if the generator is faulty and not supplying sufficient voltage, pressing button 52 will allow the battery to supply current through circuit 47a, to lamp 50 and on through circuit 23a, back to battery through ground, reestablishing the green light. Resistance 49 may be of the order of 15–30 ohms, permitting the generator test button 52 to apply the battery voltage to the generator side of the pilot lamp without shorting the battery back to the generator, which in the case of a broken fan belt would present the heavy load of the low generator armature resistance to the battery, resulting in dangerous currents through button 52. Failure of any test button to reestablish the green light of course would suggest a blown fuse 17a, meaning cut-out failure or open battery connections.

Figure 3:
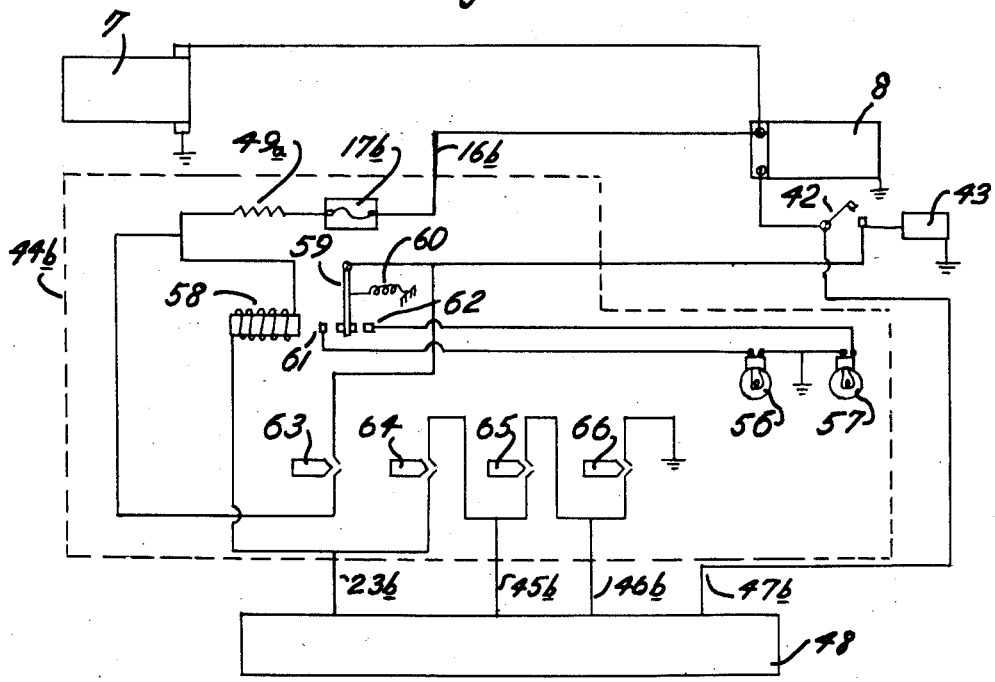
Fig. 3 is a view of a modified form of the basic signalling circuit with accompanying test circuit.

Fig. 3 shows another modification in the embodiment of my invention wherein features of Fig. 1 and Fig. 2 are combined. This modification involves the use of a green signal lamp 56 together with a red signal lamp 57. If abnormal operation of the generator, cut-out, cooling system, oil system or battery electrolyte lever occurs, the green light will be extinguished and the red light lighted. The cause of the difficulty may be ascertained by finding which test button extinguishes the red light and reestablishes the green light. Thus uniformity in test signal is achieved with duality of visual indicators, but if desired, could be obtained by the use of either the red or green light alone.

This action is realized through the use of signalling relay 58 similar to the one used in Fig. 1 but having dual contacts 61 and 62. With no current through the basic control circuit 16b, armature 59 of relay 58 is held against contact 62 by spring 60. This position applies battery voltage to red lamp 57 and on to ground, provided of course ignition switch 42 is on. Establishing control current through the winding of relay 58 by pressing the appropriate test button 63, 64, 65, 66 corresponding to test buttons 52, 53, 54 and 55 respectively in Fig. 2, energizes the relay 58 and pulls armature into contact with contact 61, which establishes green light 56 via circuit path 47b to battery voltage. The significances of the red and green lights follow directly from Fig. 1 and Fig. 2.

In this embodiment, the system of test buttons described in Fig. 2 is applied in conjunction with the winding of a relay 58, instead of lamp 50 in Fig. 2, thus yielding a uniform Generator-cutout test signal. Pressing test button 63 when the red signal is lit applies battery voltage to the relay winding via path 47b and energizes the relay if the generator is faulty, thus reestablishing the green light. Resistance 49a serves the same purpose as resistance 49 in Fig. 2.

It may be observed that this scheme permits a red signal in case of failure to turn off ignition when motor is not running.

Fig. 4 illustrates an embodiment of my invention which differs from the other applications in that the Basic control circuit employs a bi-metallic type thermal relay 68 as a Signalling relay. In the preferred form shown this relay 68 is mounted in the housing 69a of jewel-lamp structure 69 which is mounted preferably on the instrument panel of an automotive vehicle.

The relay assembly comprises an armature made of two strips of metals 71 and 72, each having a different coefficient of expansion. This armature is insulated from the jewel housing case by insulating block 73. Surrounding the composite metallic armature is a thin piece of glass fabric insulation tubing 74 on which are wound two heating coils 75 and 76. A contact 77 is attached to said armature to cooperate with contact 78 mounted on the jewel housing and insulated from the casing thereof by insulating disc 79. The bi-metallic armature is so constructed that when heated by either heating coil 75 or 76, the movement of the armature will be such as to move contact 77 away from contact 78 as shown in Fig. 4. Cooling of bi-metallic armature to ambient temperature, however, will allow contact 77 to make electrical contact with contact 78. The jewel lamp housing is of ordinary type with the lamp socket 80 insulated from the lamp housing case by means of insulating disc 79, thus keeping both sides of lamp filament insulated from lamp housing.

The operation of this embodiment is basically the same as described in Fig. 1. A series control circuit is established from the generator side of the cut-out relay 8, through fuse 17c to relay winding 76 via circuit path 106 and through this winding to the series Monitor section via circuit path 107 comprised of Oil pressure switch 24, Engine temperature switch 30, and Electrolyte level electrode 36 and then through the electrolyte to ground.

As previously, proper operation of vehicle is evidenced by a control current through the control circuit. This current passing through coil 76 of relay 68 causes the armature to heat which separates contacts 77 and 78. Failure of any monitored component terminates, or sufficiently diminishes, test circuit current and consequent heating of said armature, allowing contacts 77 to touch contact 78 which completes the electrical circuit 108 from the ignition system 43 side of ignition switch 42 through filament of lamp 81, through winding 75 of relay 68 to ground, thus lighting lamp 81 which shines through red jewel 82, signalling operator that there is trouble.

It will be noted that passage of lamp current through winding 75 of relay 68 provides means for a flashing cycle since the heat so generated in winding 75 causes said armature to open contacts 77 and 78, at which time this heating current is interrupted and cooling of armature completes lamp circuit, etc.

The attendant thermal lag of such a relay possibly provides a desirable delay in signalling when the motor is idling, such as would be the case while halted at a traffic light, etc. The idling speed of the motor may be in some cases insufficient to generate enough voltage to close the cut-out relay 8 or supply sufficient control circuit current. Hence, when used in connection with an audible signal, which may be easily achieved by substituting for or adding to the indicating lamp a buzzer or bell, this relay would find ready application. Also, the ease with which the signal may be made to flash by the simple use of the second heating coil, 75 in Fig. 4, to the armature, is of advantage. Obviously, should the flashing feature not be desired, coil 75 may be eliminated entirely and the armature consequently grounded to the lamp housing.

Fig. 5 shows a preferred form of bi-metallic relay for application in embodiments similar to Fig. 4 and whose operational characteristics are not effected by changes in ambient temperature. This relay may be directly substituted for the type shown in Fig. 4, by connecting circuits 106a, 107a and 108a in Fig. 5 to circuit paths 106, 107 and 108 respectively in Fig. 4 at the points where these designations are applied in Fig. 4.

It is noticed in Fig. 4 that thermal relay 68 may be affected by large changes in ambient temperature since the bi-metallic armature is sensitive to temperature changes, regardless of the source of heat. For instance, it is conceivable that under conditions of extreme cold, such as possible on a winter day, thermal relay 68 would fail to open even when normal control current was flowing through winding 76. Correspondingly, under extreme conditions of heat, it is possible that relay 68 would fail to close in the absence of test current.

Returning to Fig. 5 we see how failure of this kind is obviated by mounting each of the series contacts 89 and 90 to the signalling lamp 91 on bi-metallic armatures 83 and 84 respectively. The secondary bi-metallic armature 83 is mounted directly beneath and insulated from the primary bi-metallic armature 84. The composition and dimensions of the two armatures are dientical and therefore each armature has practically identical thermal qualities. The armatures are so mounted that their composite strips occupy similar positions; that is, strip 86 of armature 83 is made of the same material as strip 85 of armature 84 and they are mounted in correspondingly lower positions. Strips 87 and 88 comprising the upper components of armatures 83 and 84 are also of the same material. Both armatures are provided with identical insulation sleeves. The sleeve on the lower strip 83 not only serves to give it the same ambient temperature response as the upper strip, but also to protect it from any heat radiated from the adjacent windings 93, 94.

Now it is seen that should the ambient temperature increase, tending to move contact 90 on armature 84 away from the lamp housing 92, its companion contact 89 mounted on armature 83 moves in the same direction by the same amount and thus keeps the spacing between contacts 89 and 90 constant regardless of ambient temperature. In its embodiment in this invention, however, contacts 89 and 90 are normally closed, but with this additional ambient temperature compensating bi-metallic armature 83, the force holding the two contacts together will remain constant for any ambient temperature. Heating of armature 84 by passage of current through windings 93 or 94 again will cause the contacts 89 and 90 to separate, thereby serving the needs of a thermal relay as described in Fig. 4.

In all of the forms of the invention above described and specifically noted in Fig. 1, the intermediate battery electrode 36 is the same. It may be applied to the usual storage battery cells in any desired manner. However, to make the arrangement most adaptable it is desirable to utilize the facilities of the conventional storage battery casing.

Thus, in Fig. 6, I have shown the electrode as fitted within the usual opening provided for venting gases from the battery and for replacing the electrolyte solution. This filling opening 95 is of the usual type formed as part of the battery casing. The vent opening 96 of a normal vented cap 97 has been enlarged. This enlargement permits the introduction of the center electrode. Here this electrode is formed of a lower conducting rod 98 and a reduced upper end 99. The upper end 99 is screw threaded, but passes through the enlarged opening 96 of cap 97.

The portion 99 is longitudinally grooved as shown at 100 and this groove extends downwardly into the lower rod 98 for purposes of venting the battery cell. Collars 101, 102 and 103 are supplied of various thicknesses. When two or more such collars are supplied, it is possible to use them in the desired combination so that the lower end of rod 98 will be spaced far enough below the cap 97 to be just below the normal level of the electrolyte. The several collars may be given different numbers or colors so that may be selected for use with any particular make or type of battery in accordance with instructions to be supplied with the collars.

The upper end 99 of the electrode is tapered to receive a removable snap terminal 104 leading to the Engine temperature switch shown in Fig. 1.

The electrode is clamped tightly in the cap 97 by means of nut 105 which is screw threaded over the upper end 99 of the electrode 98 and draws the adjusting collars 101, 102 and 103 tightly against the cap 97.

During operation of the generator and with the connections shown in Fig. 1, a film of lead peroxide is probably formed on the electrode 36. It may here be noted, that in the event that the oil pressure switch 24 is omitted, a closed electrical path exists at all times from the electrode 36 through the basic test circuit to the generator terminal at 7 and then to ground. During engine idleness, this would cause a current drain from the battery in the order of a few milliamperes until a relatively non-conducting film of lead sulphate forms on the electrode, at which time this "idle" current is negligible compared to local action losses in the battery. This non-conducting film is apparently broken down by the maximum voltage of the generator that occurs prior to the closing of the cutout contacts. At this time the full voltage of the generator is applied between the grounded negative plate of cell 2 (Fig. 1) and the intermediate electrode therein.

The operation of the indicating device will be readily apparent from the above description. While I have shown the adaptivity of my indicating device in several preferred forms to an automotive power plant, other arrangements and alterations in specific details and proportions will, of course, suggest themselves without, however, departing from the scope of the following claims.

What I claim is:

1. In an indicating system for automotive vehicles, the combination of an electrical generator; a storage battery; an electrical charging circuit between the generator and battery; an electrical cutout serially connected in said charging circuit; an intermediate electrode extending below the normal level of the electrolyte in one battery cell; a normally closed fused shunt test circuit between the generator side of the electrical cutout and the intermediate electrode; a secondary circuit including an indicating means; and a single relay connected to couple said test circuit with said secondary circuit and controlled by said shunt circuit, said relay being then responsive to the normal and abnormal operating conditions of the battery electrolyte and the generator for controlling the secondary circuit and thereby the indicating means therein, whereby the latter will indicate normal or abnormal operations of the generator, cutout and battery.

2. In an electrical system for automotive vehicles, the combination of an electrical generator; a storage battery; an electrical charging circuit between the generator and battery; an electrical cutout serially connected in said charging circuit; an intermediate electrode extending below the normal level of the electrolyte in one of the battery cells; a normally closed fused shunt test circuit between the generator side of the electrical cutout and the intermediate electrode; a secondary circuit including an indicating means; a single magnetic type relay connected to couple said test circuit with said secondary circuit and controlled by the shunt circuit, said relay being then responsive to the normal and abnormal operating conditions of the battery electrolyte and the generator and controlling the second circuit and thereby the indicating means therein, whereby the latter will indicate normal or abnormal operations of the generator, cutout and battery.

3. In an electrical system for automotive vehicles, the combination of an electrical generator; a storage battery; an electrical charging circuit between the generator and battery; an electrical cutout serially connected in said charging circuit; an intermediate electrode extending below the normal level of the electrolyte in one battery cell; a normally closed fused shunt test circuit between the generator side of the electrical cutout and the intermediate electrode; a secondary circuit including an indicating means; a single coil magnetic type relay connected to couple said test circuit with said secondary circuit and controlled by the shunt circuit, said relay being then responsive to the normal and abnormal operating conditions of the battery electrolyte and the generator and controlling the second circuit and thereby the indicating means therein, whereby the latter will indicate normal or abnormal operations of the generator, cutout and battery.

4. In an electrical system for automotive vehicles the combination of an electrical generator; a storage battery; an electrical charging circuit between the generator and battery; an electrical cutout serially connected in said charging circuit; an intermediate electrode extending below the normal level of the electrolyte in one battery cell; a normally closed fused shunt circuit between the generator side of the electrical cutout and the intermediate electrode; a secondary circuit including an indicating means; and a bi-metallic relay connected to couple said test circuit with said secondary circuit and controlled by the shunt circuit, said relay being then responsive to the normal and abnormal operating conditions of the battery electrolyte and the generator and controlling the second circuit and thereby the indicating means therein, whereby the latter will indicate normal or abnormal operations of the generator, cutout and battery.

5. In an electrical system for automotive vehicles, the combination of an electrical generator; a storage battery; an electrical charging circuit between the generator and battery; an electrical cutout serially connected in said charging circuit; an intermediate electrode extending below the normal level of the electrolyte in one battery cell; a normally closed fused shunt test circuit between the generator and the intermediate electrode; a secondary circuit including an indicating means; and duplicate electrical relay members associated in relationship to compensate for changes in ambient temperatures and controlled by the shunt circuit such as to be responsive to the normal and abnormal operating conditions of the battery, cutout and the generator for controlling the second circuit and thereby the indicating means therein, whereby the latter will indicate normal or abnormal operations of the generator and battery.

6. In an electrical system for automotive vehicles, the combination of an electrical generator; a storage battery; an electrical charging circuit between the generator and battery; an electrical cutout serially connected in said charging circuit; an intermediate electrode extending below the normal level of the electrolyte in one battery cell; a normally closed fused shunt test circuit between the generator and the intermediate electrode; a secondary circuit including electrically operated visual indicating means; a bi-metallic relay connected to couple said test circuit with said secondary circuit and controlled by the shunt circuit, said relay comprising two coils whereby two types of signalling indications may be provided in the secondary circuit both responsive to the normal or abnormal operating conditions of the generator, cutout and battery.

7. In combination with an automotive vehicle, an engine; an electrical generator; a storage battery; an electrical circuit between the generator and storage battery; an automatic cut-out in the circuit controlled by the generator voltage; a shunt circuit from the cutout side of the generator; a signal means in said shunt circuit; a plurality of serially connected conductively responsive monitoring means connected in monitoring relationship with one or more of the operating functions of the engine, or of the generator, battery, or cut-out said serially connected monitoring means being connected in series with said shunt test circuit such that abnormal operation of the engine, generator, battery or cutout will alter the operation of the signal means in the shunt circuit; a plurality of test means for selectively and electrically shunting respective serially connected monitoring means such that the particular abnormal operation, whether of particular functions of the engine, or generator, cutout or battery may be determined.

8. In combination with an automotive vehicle, an engine; an electrical generator and storage battery therefor; an electrical circuit between the generator and the storage battery; a shunt test circuit connected with the battery; a plurality of serially connected conductively responsive monitoring means connected in series with said shunt test circuit such that the electrical operation of the shunt circuit is altered by the abnormal operation or condition of the generator, battery, or engine; a relay controlled by the shunt circuit; an indicating means controlled by said relay and adapted to show normal or abnormal operating conditions in the shunt circuit; a plurality of manually operated test means connected for electrical shunting of said conductively responsive monitoring means for selectively determining from where the indication of faulty operation arose.

9. In combination with an automotive vehicle, an engine; an electrical generator and storage battery therefor; an electrical circuit between the generator and the storage battery; a shunt test circuit connected with the battery; a plurality of serially connected conductively responsive monitoring means connected in series with said shunt test circuit such that the electrical operation of the shunt circuit is altered by the abnormal operation or condition of the generator, battery or engine; a magnetic type relay controlled by the shunt circuit; an indicating means controlled by the relay and adapted to show normal or abnormal operating conditions in the shunt circuit; a plurality of manually operated test means connected for electrical shunting of said conductively responsive monitoring means for selectively determining from where the indication of faulty operation arose.

10. In an automotive vehicle, an engine; a storage battery; an electrical generator and cutout therefor connected with the storage battery; an ignition system for the engine; a lubricating system for the engine; a cooling system for the engine; a shunt circuit between the generator and battery around the cut-out; an indicating signal controlled from the shunt circuit; a plurality of serially connected conductively responsive monitoring means respectively coupled with said storage battery, said electrical generator, said cutout, said ignition system, said lubricating system and said cooling system for response to abnormal operation thereof such that either insufficient oil pressure in the oil system of the engine, excessive temperature of the engine, improper functioning of the generator cutout unit, insufficient electrolyte in the storage battery, leaving the ignition switch on after the engine has stopped operating, will influence the shunt circuit to control the signalling means to warn of the abnormal operating condition; and a plurality of manually operable test means for electrically shunting respective conductively responsive monitoring means selectively determining the portion of the system where the abnormal condition exists.

HAYNER H. GORDON.

REFERENCES CITED

The following references are of record in the file of this patent:

UNITED STATES PATENTS

| Number | Name | Date |
| --- | --- | --- |
| 1,431,914 | Dashner et al. | Oct. 10, 1922 |
| 1,694,687 | McCartie | Dec. 11, 1928 |
| 2,064,460 | Carr et al. | Dec. 15, 1936 |
| 2,074,895 | Durant | Mar. 23, 1937 |
| 2,135,303 | Greene | Nov. 1, 1938 |
| 2,362,021 | Nazar | Nov. 7, 1944 |
| 2,377,569 | Morse | June 5, 1945 |